(12) United States Patent
Imai

(10) Patent No.: US 6,763,235 B2
(45) Date of Patent: Jul. 13, 2004

(54) METHOD AND SYSTEM FOR MOBILE COMMUNICATION, AND A COMPUTER PRODUCT

(75) Inventor: Yuji Imai, Irvine, CA (US)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 09/778,871

(22) Filed: Feb. 8, 2001

(65) Prior Publication Data

US 2002/0037728 A1 Mar. 28, 2002

(30) Foreign Application Priority Data

Jul. 4, 2000 (JP) ........................................ 2000-202817

(51) Int. Cl.$^7$ ................................................. H04Q 7/20
(52) U.S. Cl. ........................ 455/443; 455/436; 455/438
(58) Field of Search ................................ 455/436, 437, 455/438, 439, 525, 443

(56) References Cited

U.S. PATENT DOCUMENTS 6,181,931 B1 * 1/2001 Alldredge .................... 455/427
6,473,411 B1 * 10/2002 Kumaki et al. ............. 370/331
2002/0176383 A1 * 11/2002 Inoue et al. ................. 370/331

* cited by examiner

Primary Examiner—Nguyen T. Vo
Assistant Examiner—A. Behulu
(74) Attorney, Agent, or Firm—Staas & Halsey LLP

(57) ABSTRACT

A management server managing a fixed address of a mobile terminal, at least two dynamic addresses dynamically allotted to the mobile terminal when it exists in two service areas at one time. A host transmits a packet with the fixed address of the mobile terminal used as a header. If the mobile terminal exist in at least the two service areas (apart from other areas), it notifies a management server of the dynamic addresses of the two service areas in real time. If the packet is transmitted from the host and the two dynamic addresses are allotted to the mobile terminal, the management server transfers a packet with these two dynamic addresses used as a header.

12 Claims, 9 Drawing Sheets

METHOD AND SYSTEM FOR MOBILE COMMUNICATION, AND A COMPUTER PRODUCT

FIELD OF THE INVENTION

The present invention in general relates to a technology applied in mobile terminals such as portable telephones and portable information equipments, or mobile communication control devices. This invention particularly relates to a technology which reduces the labor required for network management and control load relating to hand-over (switchover of containing radio base stations).

BACKGROUND OF THE INVENTION

In recent years, with the explosive spread of mobile terminals, network control and management tend to become increasingly complicated. During hand-over for smoothly switching over containing radio base stations following the area movement of a mobile terminal, particularly, it is necessary to make equipment on the network cooperate with one another. Due to this, the problem of network control and management load appears. Means and methods for effectively solving this problem have been, therefore, demanded.

FIG. 9 is a block diagram that shows the constitution of a conventional mobile communication system. As shown in this figure, a fixed telephone 1 is installed in, for example, a company or house and serves as a terminal establishing voice-communication with a mobile terminal 10 to be described later or other fixed telephones through an external network 2. A switchboard 3 is contained in the external network 2 and switches over calls. A management server 4 manages positional information indicating the position (area) at which the mobile terminal 10 is present. A region main switchboard 5 is contained in a mobile communication network 6 and switches over calls.

A switchboard $7_1$ is contained in the mobile communication network 6 and switches over mobile communication calls. This switchboard $7_1$ contains radio base stations $8_1$ and $8_2$. The radio base station $8_1$ establishes communication with the mobile terminal within an area $9_1$ through a radio line. The radio base station $8_2$ establishes communication with a mobile terminal within an area $9_2$ adjacent the area $9_1$ through a radio line.

A switchboard $7_2$ is contained in the mobile communication network 6 and switches over mobile communication calls. This switchboard $7_2$ contains radio base stations $8_3$ and $8_4$. The radio base station $8_3$ establishes communication with the mobile terminal within an area $9_3$ adjacent the area $9_2$ through a radio line. The radio base station $8_4$ establishes communication with the mobile terminal within an area $9_4$ adjacent the area $9_3$ through a radio line.

The mobile terminal 10 is a portable telephone or the like and establishes radio-communication with any one of the radio base stations $8_1$ to $8_4$ if the terminal 10 is located in any one of the areas $9_1$ to $9_4$. The mobile terminal 10 regularly informs the management server 4 of positional information. Here, in the areas $9_1$ to $9_4$ stated above, a multi-area method by which adjacent two areas are set to overlap each other is adopted. In the overlapping areas, therefore, the mobile terminal 10 informs the management server 4 of information on two positions.

With the above constitution, when the fixed telephone 1 calls the mobile terminal 10, the call from the fixed telephone 1 reaches the switchboard 3 through the external network 2. Accordingly, the switchboard 3 accesses the management server 4 and acquires positional information on the mobile terminal 10. In this case, it is assumed that the mobile terminal 10 is located in the area $9_1$. Next, the switchboard 3 switches over the call to the regional main switchboard 5. Accordingly, a wire line is set in the route of the mobile communication network 6, the switchboard $7_1$ and the radio base station $8_1$ and further the mobile terminal 10 in the area $9_1$ is called by the radio base station $8_1$ through the radio line. When the mobile terminal 10 responds to the call, a line is established between the fixed telephone 1 and the mobile terminal 10.

Assumed that the mobile terminal 10 is moving from the area $9_1$ to the area $9_2$ while the communication line is being established. Namely, the mobile terminal 10 is located in a portion in which the areas $9_1$ and $9_2$ overlap each other. Therefore, the mobile terminal 10 informs the management server 4 of not only positional information corresponding to the area $9_1$ but also that corresponding to the area $9_2$ through the radio base station $8_2$, the switchboard $7_1$, the mobile communication network 6 and the regional main switchboard 5.

Here, if a reception field intensity corresponding to the radio base station $8_2$ exceeds that corresponding to the radio base station $8_1$, the mobile terminal 10 informs the radio base station $8_2$ of a switchover request for switching over the containing radio base station from the radio base station $8_1$ to the radio base station $8_2$. Following this, the radio base station $8_2$ informs the management server 4 of the switchover request by way of the switchboard $7_1$, the mobile communication network 6 and the regional main switchboard 5.

The management server 4 notifies the switchboard $7_1$ that the containing radio base station of the mobile terminal 10 should be switched over from the radio base station $8_1$ to the radio base station $8_2$. By doing so, information necessary for line control is transmitted from the radio base station $8_1$ to the radio base station $8_2$ through the switchboard $7_1$. When receiving the information, the radio base station $8_2$ establishes a radio line with the mobile terminal 10 in the area $9_2$. Next, the radio base station $8_1$ disconnects the radio line with the mobile terminal 10. In this way, the mutual cooperation among the switchboard $7_1$, the radio base station $8_1$, the radio base station $8_2$ and the management server 4 conventionally allows smooth switchover (hand-over) from the radio base station $8_1$ to the radio base station $8_2$.

In the meantime, as already described above, during hand-over in mobile communications, control and management are required to make a plurality of equipment (the radio base station $8_1$, the switchboard $7_1$, the management server 4 and the like) at the wire network side cooperate with one another. However, during the hand-over, since it is necessary to communicate information among the equipment and to conduct complex control, great network management and control load is generated. Particularly, in circumstances where the number of operating mobile terminals increases rapidly, the network management and control load increases steadily, accordingly.

SUMMARY OF THE INVENTION

It is an object of the present invention to provide a method and system for mobile communication which reduces a work load of network control and management during hand-over. It is another object of this invention to provide a computer readable recording medium that stores a computer program which when executed realizes the method according to the present invention.

The mobile communication system according to the present invention comprises a management server which manages a fixed address of the mobile terminal and not less than one dynamic address dynamically allotted to the mobile terminal within not less than one service area and a host transmitting information with the fixed address used as a header. The mobile terminal notifies the management server of the dynamic address in a real time manner, and notifies, if stretching over at least two service areas, the management server of a first dynamic address and a second dynamic address corresponding to the at least two service areas. The management server transfers the information with the first dynamic address and the second dynamic address used as a header if the information is transmitted from the host and the first dynamic address and the second dynamic address are allotted to the mobile terminal.

Thus, if one or more dynamic addresses of the mobile terminal are managed unitarily by the management server in a real time manner, information is transmitted from the host and one or more dynamic addresses are allotted to the mobile terminal, then information is transferred while using the one or more dynamic addresses allotted at this moment as a header. Therefore, compared with a conventional case, it is possible to reduce network control and management load relating to hand-over.

Furthermore, if the mobile terminal stretches over at least two service areas, information is transferred while using the first dynamic address and the second dynamic address corresponding to the respective service areas as a header. It is, therefore, possible to considerably decrease the probability of momentary disconnection during hand-over.

Other objects and features of this invention will become apparent from the following description with reference to the accompanying drawings.

DESCRIPTION OF THE PREFERRED EMBODIMENTS

A preferred embodiment according to the present invention and its modification will be explained below with reference to the attached drawings.

Figure 1:
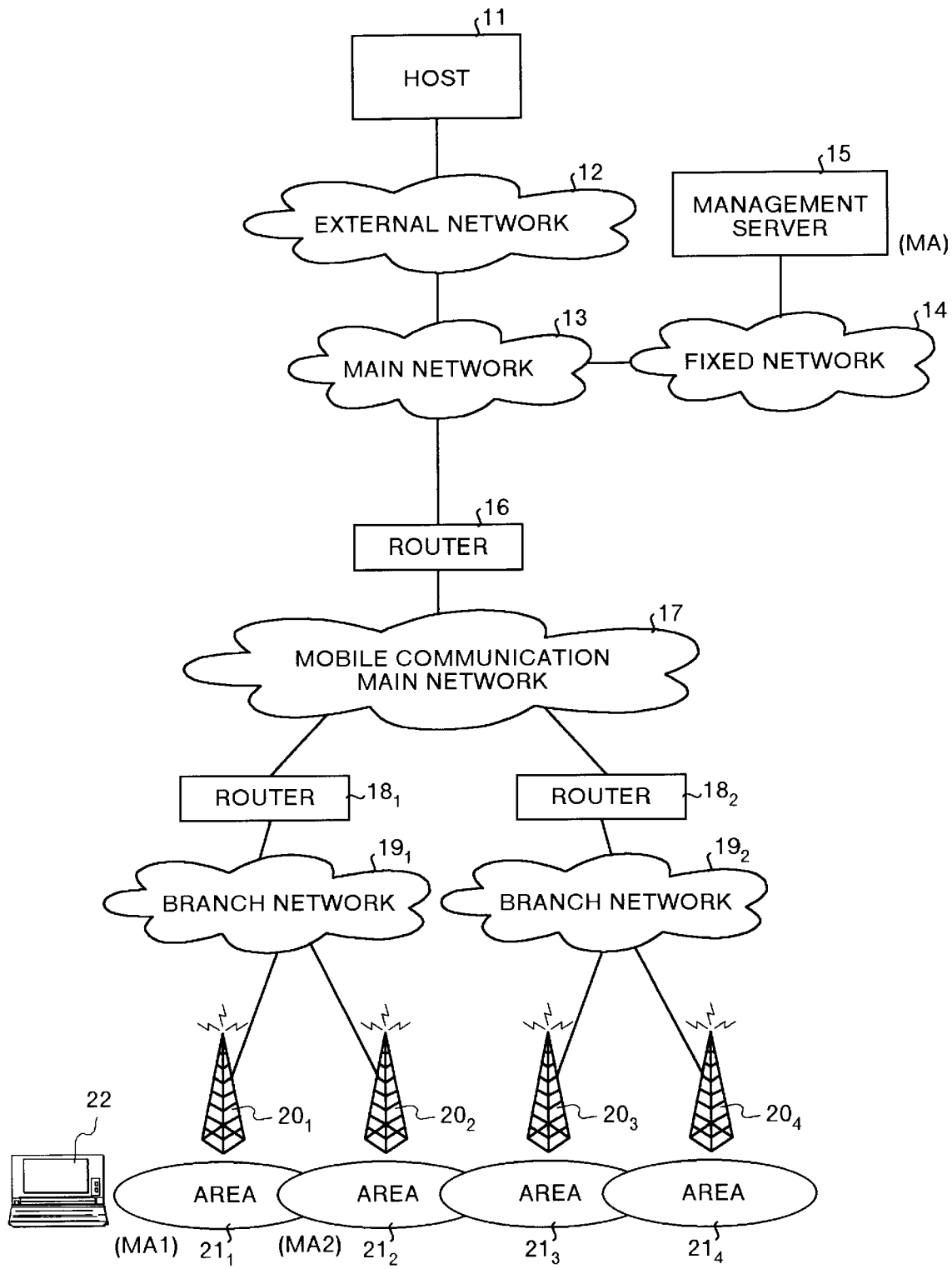
FIG. 1 is a block diagram showing the constitution of one embodiment according to the present invention.

FIG. 1 is a block diagram showing the constitution of one embodiment according to the present invention. As shown in this figure, a host 11 is connected to an external network 12 and transmits packets to the fixed address MA of a mobile terminal 22 to be described later. This external network 12 is connected to a main network 13. A fixed network 14 is connected to the main network 13. The mobile terminal 22 to be described later is connected to the fixed network 14. In FIG. 1, the mobile terminal 22 is separated from the fixed network 14. The fixed address MA is allotted, as an IP address, to the mobile terminal 22 to be connected to the fixed network 14.

A management server 15 manages the fixed address MA of the mobile terminal 22, dynamic addresses MA1, MA2 and the like to be described later. A router 16 is interposed between the main network 13 and a mobile communication main network 17, and routes packets. A router $18_1$ is interposed between the mobile communication main network 17 and a branch network $19_1$ and routes packets. This branch network $19_1$ contains radio base stations $20_1$ and $20_2$. The radio base station $20_1$ communicates with the mobile terminal within an area $21_1$ through a radio line. On the other hand, the radio base station $20_2$ communicates with the mobile terminal within an area $21_2$ adjacent the area $21_2$.

A router $18_2$ is interposed between the mobile communication main network 17 and a branch network $19_2$ and routes packets. This branch network $19_2$ contains radio base stations $20_3$ and $20_4$. The radio base station $20_3$ communicates with the mobile terminal within an area $21_3$ through a radio line. The radio base station $20_4$ communicates with the mobile terminal within an area $21_4$ adjacent the area $21_3$ through a radio line.

The mobile terminal 22 is a portable information terminal or the like and establishes radio-communication with one of or a plurality of the radio base stations $20_1$ to $20_4$ if the terminal 22 is located in any one of the areas $21_1$ to $21_4$. Also, dynamic addresses are allotted to the mobile terminal 22 for the respective areas. If the mobile terminal 22 is located in the area $21_1$, for example, a dynamic address MA1 is allotted to the mobile terminal 22. If the mobile terminal 22 is located in the area $21_2$, a dynamic addresses MA2 is allotted to the mobile terminal 22. Here, in the above-stated areas $21_1$ to $21_4$, a multiple area mode by which adjacent two areas are set to overlap each other is adopted. In overlapping areas, therefore, two dynamic addresses are allotted to the mobile terminal 22.

OPERATION EXAMPLE 1

Figure 3A:
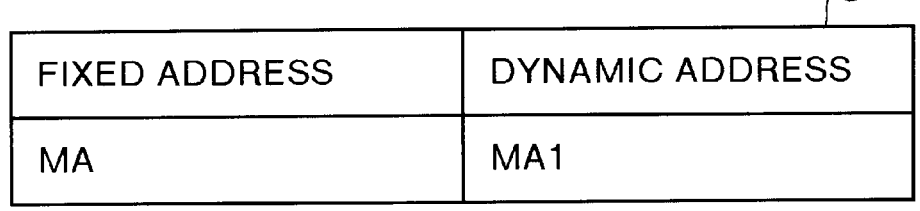
FIG. 3A to FIG. 3C show dynamic address addition list packets 200, 210 and a dynamic address deletion list packet 220.

Next, an operation example 1 of the present invention will be described while referring to FIG. 1. When the mobile terminal 22 enters the area $21_1$, the dynamic address MA1 is allotted to the mobile terminal 22. The mobile terminal 22 transmits a dynamic address addition list packet 200 shown in FIG. 3A to the management server 15, accordingly.

Figure 2A:
FIG. 2A to FIG. 2D show dynamic address management tables 100, 110, 120 and 130.

The dynamic address addition list packet 200 is a packet for requesting the management server 15 to add the dynamic address MA1 to a "dynamic address" field on a dynamic address management table 100 shown in FIG. 2A. The dynamic address list packet 200 is received by the management server 15 by way of the radio base station $20_1$, the branch network $19_1$, the router $18_1$, the mobile communication main network 17, the router 16, the main network 13 and the fixed network 14.

Figure 2B:
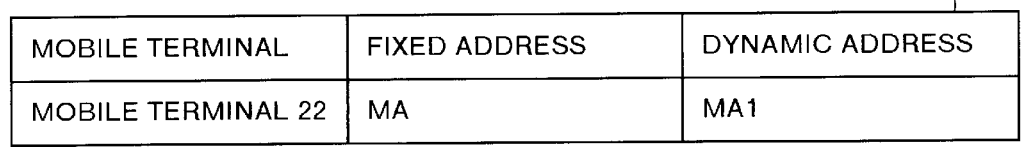

The management server 15 adds the dynamic address MA1(see FIG. 3A) within the dynamic address addition list packet 200 to the "dynamic address" field on the dynamic address management table 100 (see FIG. 2A) which field corresponds to the mobile terminal 22, as shown in FIG. 2B. Thus, the dynamic address table 100 becomes a dynamic address management table 110. During this state, if a packet is transmitted from the host 11 to the mobile terminal 22, the host 11 transmits a packet with the fixed address MA of the mobile terminal 22 used as a header. As a result, the packet is transmitted to the fixed address MA by way of the external network 12, the main network 13 and the fixed network 14.

However, since the mobile terminal 22 is not connected to the fixed network 14, the management server 15 receives the above-stated packet in place of the mobile terminal 22. Next, the management server 15 refers to the dynamic address management table 110 shown in FIG. 2B and transmits the packet with the dynamic address MA1 allotted to the mobile terminal 22 used as a new header. By doing so, the packet is received by the mobile terminal 22 within the area $21_1$ by way of the fixed network 14, the main network 13, the router 16, the mobile communication main network 17, the router $18_1$, the branch network $19_1$ and the radio base station $20_1$.

Figure 3B:
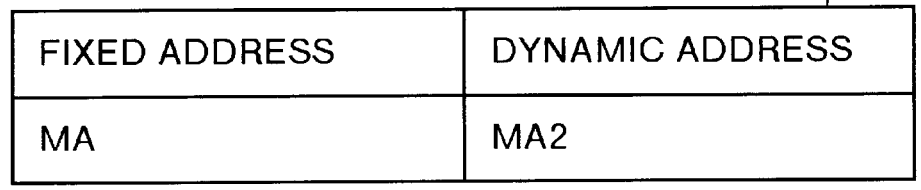

During this state, if the mobile terminal 22 moves to an area in which the areas $21_1$ and $21_2$ overlap each other, a dynamic address MA2 as well as the dynamic address MA1 is allotted to the mobile terminal 22. The mobile terminal 22 transmits a dynamic address addition list packet 210 shown in FIG. 3B to the management server 15, accordingly.

This dynamic address addition list packet 210 is a packet for requesting the management server 15 to add the dynamic address MA2 to the "dynamic address" field on the dynamic address management table 110 shown in FIG. 2B. The dynamic address addition list packet 210 is received by the management server 15 by way of the radio base station $20_1$, the branch network $19_1$, the router 18, the mobile communication main network 17, the router 16, the main network 13 and the fixed network 14.

Figure 2C:
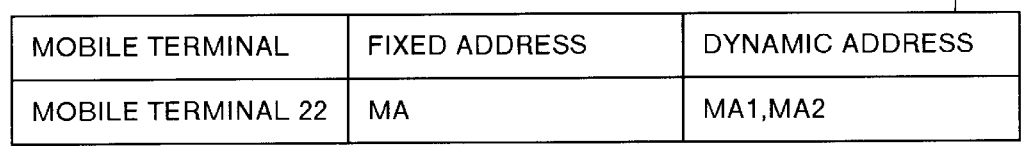

The management server 15 adds the dynamic address MA2(see FIG. 3B) within the dynamic address addition list packet 210 to the "dynamic address field" on the dynamic address management table 110 (see FIG. 2B) which field corresponds to the mobile terminal 22 as shown in FIG. 2C. Thus, the dynamic address management table 11 becomes a dynamic address management table 120.

In this case, the management server 15 refers to the dynamic address management table 120 shown in FIG. 2C and outputs a packet with the dynamic addresses MA1 and MA2 currently allotted to the mobile terminal 22 used as a new header. By doing so, the packet is received by the router 18, by way of the router 16 and the mobile communication main network 17. The router $18_1$ refers to the header (the dynamic addresses MA1 and MA2) of the packet, duplicates the packet and routes the packets to both the radio base stations $20_1$ and $20_2$. As a result, the packet is received by the mobile terminal 22 within the areas $21_1$ and $21_2$.

Figure 3C:
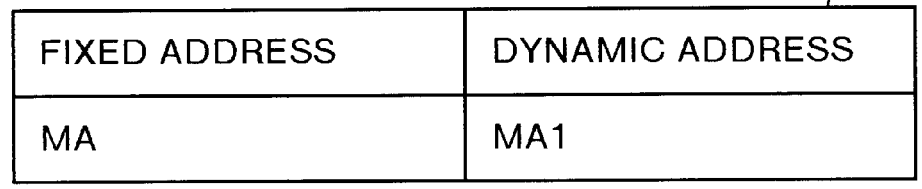

During this state, if the mobile terminal 22 goes out of the area $21_1$ and exists only in the area $21_2$, the allotment of the dynamic address MA1 to themobile terminal 22 is released and only the dynamic address MA2 is allotted to the mobile terminal 22. Thus, the mobile terminal 22 transmits the dynamic address deletion list packet 220 shown in FIG. 3C to the management server 15.

This dynamic address deletion list packet 220 is a packet for requesting the management server 15 to delete the dynamic address MA1 from the "dynamic address" field on the dynamic address management table 120 shown in FIG. 2C. The dynamic address deletion list packet 220 is received by the management server 15 by way of the radio base station $20_2$, the branch network $19_1$, the router $18_1$, the mobile communication main network 17, the router 16, the main network 13 and the fixed network 14.

Figure 2D:
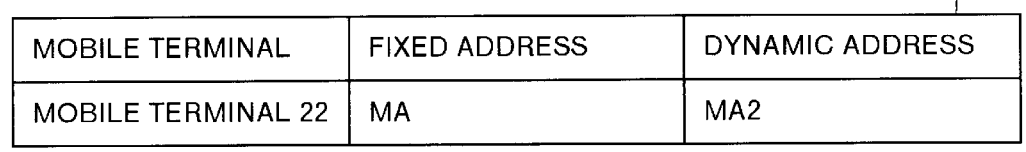

The management server 15 deletes the dynamic address MA1 (see FIG. 3C) from the "dynamic address" field on the dynamic address management table 120 (see FIG. 2C) which field corresponds to the mobile terminal 22 as shown in FIG. 2D. Thus, the dynamic address management table 120 becomes a dynamic address management table 130.

In this case, the management server 15 refers to the dynamic address management table 130 shown in FIG. 2D and transmits a packet with the dynamic address MA2 currently allotted to the mobile terminal 22 used as a new header. By doing so, the packet is received by the mobile terminal 22 within the area $21_2$ by way of the router 16, the mobile communication main network 17, the router $18_1$, the branch network $19_1$ and the radio base station $20_2$.

OPERATION EXAMPLE 2

Next, an operation example 2 of the present invention will be described while referring to FIG. 1. When the mobile terminal 22 enters the area $21_1$, the dynamic address MA1 is allotted to the mobile terminal 22. The mobile terminal 22 transmits the dynamic address addition list packet 200 shown in FIG. 3A to the management server 15, accordingly. As a result, as in the case of the operation example 1 described above, the dynamic address addition list packet 200 is received by the management server 15.

The management server 15 adds the dynamic address MA1(see FIG. 3A) within the dynamic address addition list packet 200 to the "dynamic address field" on the dynamic address management table 100 (see FIG. 2A) which field corresponds to the mobile terminal 22 as shown in FIG. 2B. Thus, the dynamic address management table 100 becomes the dynamic address management table 110.

Figure 4A:
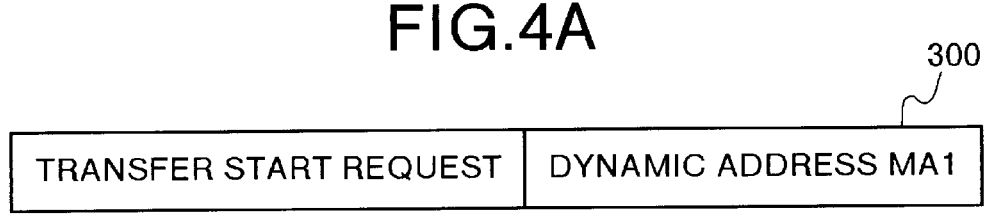
FIG. 4A to FIG. 4C show transfer start request packets 300, 310 and a transfer stop request packet 320.

Further, simultaneously with the transmission of the dynamic address addition list packet 200, the mobile terminal 22 transmits a transfer start request packet 300 shown in FIG. 4A to the radio base station $20_1$. This transfer start request packet 300 is a packet for requesting the radio base station $20_1$ to start transferring a packet addressed to the mobile terminal 22 (or the dynamic address MA1 in this case).

Figure 5A:
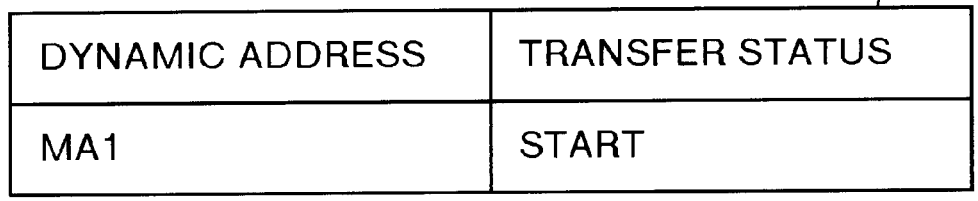
FIG. 5A to FIG. 5C show transfer status tables 400, 410 and 420.

When receiving the transfer start request packet 300, the radio base station $20_1$ creates a transfer status table 400 shown in FIG. 5A based on the transfer start request packet 300. This transfer status table 400 is comprised of a "dynamic address" field indicating a dynamic address to which a packet is transferred, and a "transfer status" field indicating whether to start or stop transfer. In the example shown in FIG. 5A, it is assumed that "dynamic address"= "dynamic address MA1" and "transfer status"="start".

During this state, if a packet is transmitted from the host 11 to the mobile terminal 22, the host 11 transmits a packet with the fixed address MA of the mobile terminal 22 used as a header. By doing so, the packet is transmitted to the fixed address MA by way of the external network 12, the main network 13 and the fixed network 14.

However, since the mobile terminal 22 is not connected to the fixed network 14, the management server 15 refers to the dynamic address management table 110 shown in FIG. 2B and transmits the above-stated packet with the dynamic address MA1 allotted to the mobile terminal 22 used as a new header as in the case of the operation example 1 already described above. As a result, the packet is received by the radio base station $20_1$ by way of the fixed network 14, the main network 13, the router 16, the mobile communication main network 17, the router $18_1$ and the branch network $19_1$.

The radio base station $20_1$ refers to the transfer status table 400 shown in FIG. 5A using the header (dynamic address MA1) of the received packet as a key, and recognizes that the "transfer status" relating to the dynamic address is "start". In this case, the radio base station $20_1$ transfers the packet to the dynamic address MA1. By doing so, the packet is received by the mobile terminal 22 through the radio line.

During this state, if the mobile terminal 22 moves to an area in which the areas $21_1$ and $21_2$ overlap each other, the dynamic address MA2 as well as the dynamic address MA1 is allotted to the mobile terminal 22. Thus, as in the case of the operation example 1, the mobile terminal 22 transmits the dynamic address addition list packet 210 shown in FIG. 3B to the management server 15. This dynamic address addition list packet 210 is received by the management server 15 by way of the radio base station $20_2$, the branch network $19_1$, the router $18_1$, the mobile communication main network 17, the router 16, the main network 13 and the fixed network 14.

The management server 15 adds the dynamic address MA2(see FIG. 3B) within the dynamic address addition list packet 210 to the "dynamic address" field on the dynamic address management table 110 (see FIG. 2B) which field corresponds to the mobile terminal 22 as shown in FIG. 2C. Thus, the dynamic address management table 110 becomes the dynamic address management table 120.

In this case, as in the case of the operation example 1, the management server 15 outputs a packet with the dynamic addresses MA1 and MA2 currently allotted to the mobile terminal 22 used as a new header. By doing so, the packet is received by the router $18_1$ by way of the fixed network 14, the main network 13, the router 16 and the mobile communication main network 17. The router $18_1$ refers to the header (dynamic addresses MA1 and MA2) of the packet, duplicates the packets and routes these packets to both the radio base stations $20_1$ and $20_2$.

Then, the radio base station $20_1$ refers to the transfer status table 400 (see FIG. 5A) and transfers the above-stated packet to the dynamic address MA1 (or the mobile terminal 22) through the radio line. The radio base station $20_2$, which does not receives the transfer start request packet from the mobile terminal 22, destroys the packet and does not transfer the packet to the dynamic address MA2 (or the mobile terminal 22). In this case, therefore, the mobile terminal 22 receives the packet from the radio base station $20_1$.

Figure 4B:
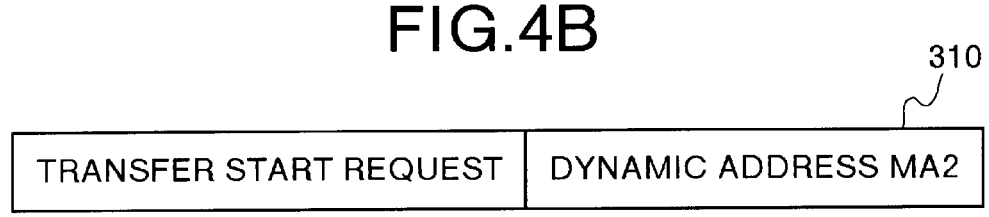

Here, if a reception field intensity corresponding to the radio base station $20_2$ exceeds that corresponding to the radio base station $20_1$, the mobile terminal 22 transmits a transfer start request packet 310 shown in FIG. 4B to the radio base station $20_2$. This transfer start request packet 310 is a packet for requesting the radio base station $20_2$ to start transferring the packet addressed to the mobile terminal 22 (or the dynamic address MA2 in this case).

Figure 5B:
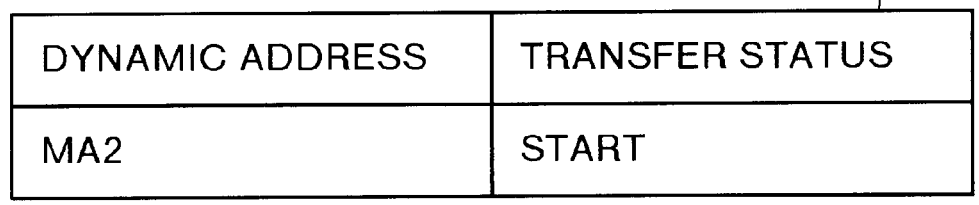

When receiving the transfer start request packet, the radio base station $20_2$ creates a transfer status table 410 shown in FIG. 5B based on the transfer start request packet 310. This transfer status table 410 is comprised of a "dynamic address" field indicating a dynamic address to which a packet is transferred and a "transfer status" field indicating whether to start or stop transfer. In the example shown in FIG. 5B, it is assumed that "dynamic address"="dynamic address MA2" and "transfer status"="start".

Figure 4C:
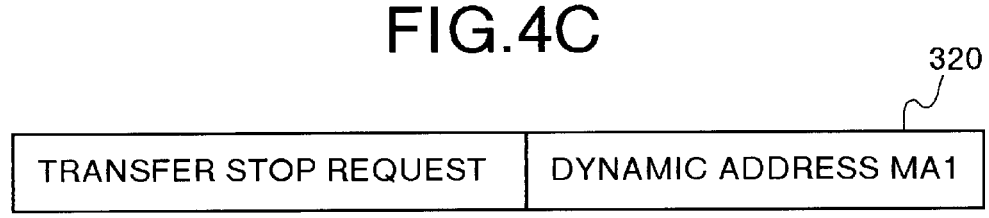

Next, the mobile terminal 22 transmits a transfer stop request packet 320 shown in FIG. 4C to the radio base station $20_1$. This transfer stop request packet 320 is a packet for requesting the radio base station $20_1$ to stop transferring the packet to the mobile terminal 22 (or the dynamic address MA1 in this case).

Figure 5C:
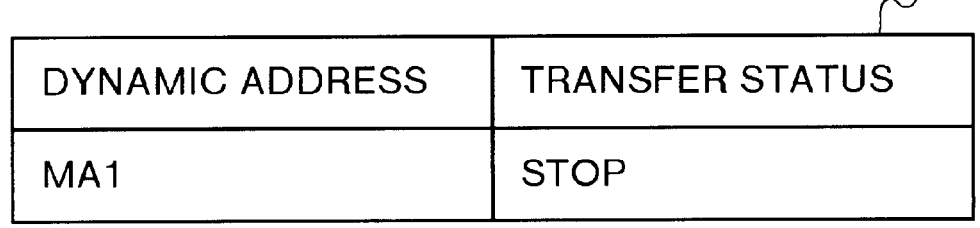

When receiving the transfer stop request packet, the radio base station $20_1$ changes the "transfer status" on the transfer status table shown in FIG. 5A from "start" to "stop" based on the transfer stop request packet 320. As a result, the transfer status table 400 becomes a transfer status table 420 shown in FIG. 5C.

Then, the radio base station $20_2$ refers to a transfer status table 410 (see FIG. 5B) and transfers the packet to the dynamic address MA2 (or the mobile terminal 22) through the radio line. Thereafter, the radio base station $20_1$ refers to a transfer status table 420 (see FIG. 5C) and stops transferring the packet to the dynamic address MA1 (or the mobile terminal 22). In this case, therefore, the mobile terminal 22 receives the packet from the radio base station $20_2$. As can be seen, in the operation example 2, even while the area $21_1$ is switched to the area $21_2$, communication is not momentarily stopped.

During this state, if the mobile terminal 22 goes out of the area $21_1$ and exists only in the area $21_2$, the allotment of the dynamic address MA1 to the mobile terminal 22 is released and the mobile terminal 22 is allotted only the dynamic address MA2. Due to this, the mobile terminal 22 transmits the dynamic address deletion list packet 220 shown in FIG. 3C to the management server 15.

This dynamic address deletion list packet 220 is a packet for requesting the management server 15 to delete the dynamic address MA1 from the "dynamic address" field on the dynamic address management table shown in FIG. 2C. The dynamic address deletion list packet 220 is received by the management server 15 by way of the radio base station $20_2$, the branch network $19_1$, the router $18_1$, the mobile communication main network 17, the router 16, the main network 13 and the fixed network 14.

The management server 15 deletes the dynamic address MA1 (see FIG. 3C) from the "dynamic address" field on the dynamic address management table 120 (see FIG. 2C) which field corresponds to the mobile terminal 22 as shown in FIG. 2D. Thus, the dynamic address management table 120 becomes the dynamic address management table 130.

In this case, the management server 15 refers to the dynamic address table 130 shown in FIG. 2D, and outputs a packet with the dynamic address MA2 currently allotted to the mobile terminal 22 used as a new header. By doing so, the packet is received by the radio base station $20_2$ by way of the fixed network 14, the main network 13, the router 16, the mobile communication main network 17, the router $18_1$ and the branch network $19_1$. Finally, the packet is retransmitted to the mobile terminal 22 (to the dynamic address MA2) by the radio base section $20_2$.

OPERATION EXAMPLE 3

Next, an operation example 3 of the present invention will be described while referring to FIG. 1. When the mobile terminal 22 enters the area $21_1$, the dynamic address MA1 is allotted to the mobile terminal 22. The mobile terminal 22 transmits the dynamic address addition list packet 200 shown in FIG. 3A to the management server 15, accordingly. As a result, the dynamic address addition list packet 200 is received by the management server 15 by way of the radio base station $20_1$, the branch network $19_1$, the router $18_1$, the mobile communication main network 17, the router 16, the main network 13 and the fixed network 14 as in the case of the operation example 1.

The management server 15 adds the dynamic address MA1(see FIG. 3A) within the dynamic address addition list packet 200 to the "dynamic address" field on the dynamic address management table 100 (see FIG. 2A which field corresponds to the mobile terminal 22 as shown in FIG. 2B. Thus, the dynamic address management table 100 becomes the dynamic address management table 110. During this state, if a packet is transmitted from the host 11 with the fixed address MA of the mobile terminal 22 used as a header, this packet is transmitted to the fixed address MA by way of the external network 12, the main network 13 and the fixed network 14.

However, since the mobile terminal 22 is not connected to the fixed network 14, the management server 15 refers to the dynamic address management table shown in FIG. 2B and outputs a packet with the dynamic address MA1 allotted to the mobile terminal 22 used as a header as in the case of the operation example 1. As a result, the packet is received by the mobile terminal 22 within the area $21_1$ by way of the fixed network 14, the main network 13, the router 16, the mobile communication main network 17, the router $18_1$, the branch network $19_1$ and the radio base station $20_1$.

Figure 6A:
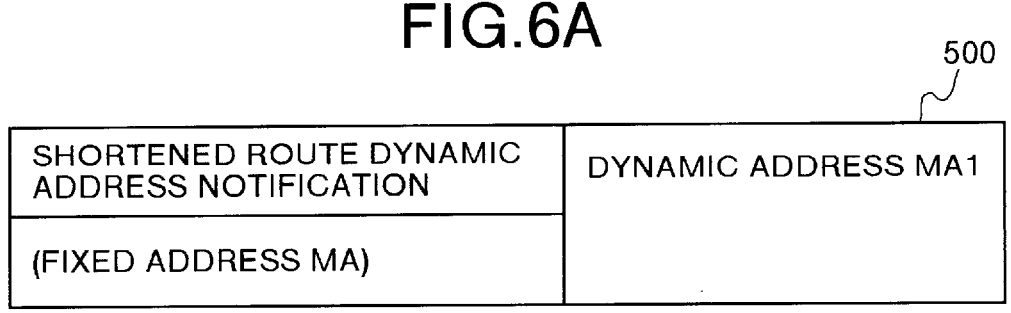
FIG. 6A to FIG. 6C show shortened route dynamic address notification packets 500, 510 and 520.

Further, the management server 15 outputs a shortened route dynamic address notification packet 500 shown in FIG. 6A to the host 11 after outputting the packet. This shortened route dynamic address notification packet 500 is a packet for notifying the dynamic address MA1 for shortening a packet route from the host 11 to the mobile terminal 22.

That is to say, the packet transmitted from the host 11 is transferred to the mobile terminal 22 through the management server 15. In this case, therefore, the packet route becomes longer by a degree to which the packet goes through the management server 15. In the operation example 3, therefore, the shortened route dynamic address notification packet 500 is employed so as to directly transmit the packet to the mobile terminal 22 allotted the dynamic address without going through the management server 15.

Figure 7A:
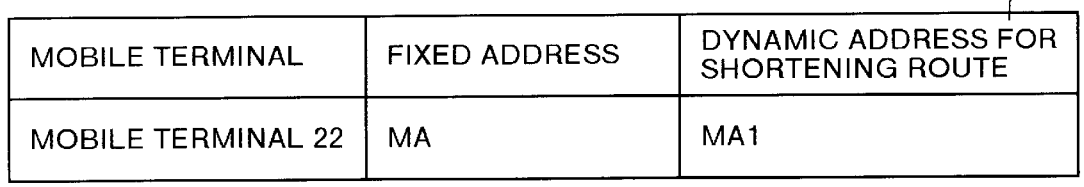
FIG. 7A to FIG. 7C show shortened route dynamic address tables 600, 610 and 620.

The shortened route dynamic address notification packet 500 is received by the host 11 by way of the fixed network 14, the main network 13 and the external network 12. The host 11 creates a shortened router dynamic address table 600 shown in FIG. 7A based on the shortened route dynamic address notification package 500. This shortened route dynamic address table 600 is comprised of a "mobile terminal" field, a "fixed address" field and a "route shortening dynamic address" field. In the example shown in FIG. 7A, it is assumed that "mobile terminal"=mobile terminal 22, "fixed address"=MA and "route shortening dynamic address"=MA1.

The host 11 refers to the shortened route dynamic address table 600 and changes the current header of the packet addressed to the mobile terminal 22 from "fixed address MA" to "dynamic address MA1". By doing so, the host 11 transmits a packet with the dynamic address MA1 used as a header. This packet is directly received by the mobile terminal 22 by way of the external network 12, the main network 13, the router 16, the mobile communication main network 17, the router $18_1$, the branch network $19_1$ and the radio base station $20_1$ without going through the management server 15.

During this state, if the mobile terminal 22 moves to an area in which the areas $21_1$ and $21_2$ overlap each other, the dynamic address MA2 as well as the dynamic address MA1 is allotted to the mobile terminal 22. The mobile terminal 22 transmits the dynamic address addition list packet 210 shown in FIG. 3B to the management server 15, accordingly. This dynamic address addition list packet 210 is received by the management server 15 by way of the radio base station $20_1$, the branch network $19_1$, the router $18_1$, the mobile communication main network 17, the router 16, the main network 13 and the fixed network 14 as in the case of the operation example 1.

The management server 15 adds the dynamic address MA2(see FIG. 3B) within the dynamic address addition list packet 210 to the "dynamic address" field on the dynamic address management table (see FIG. 2B) which field corresponds to the mobile terminal 22 as shown in FIG. 2C. Thus, the dynamic address management table 110 become the dynamic address management table 120.

In this case, the management table 15 refers to the dynamic address management table 120 shown in FIG. 2C, and outputs a packet with the dynamic addresses MA1 and MA2 currently allotted to the mobile terminal 22 used as a new header. By doing so, the packet is received by the router $18_1$ by way of the fixed network 14, the main network 13, the router 16 and the mobile communication main network 17. The router $18_1$ refers to the header (or the dynamic addresses MA1 and MA2) of the packet, duplicates the packet and routes these packets to both the radio base stations $20_1$ and $20_2$. As a result, the packet is received by the mobile terminal 22 within the areas $21_1$ and $21_2$.

Figure 6B:
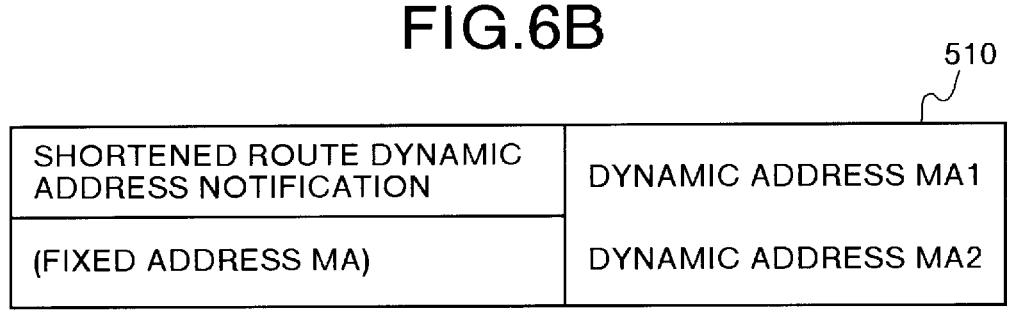

Further, the management server 15 outputs a shortened route dynamic address notification packet 510 shown in FIG. 6B to the host 11. This shortened route dynamic address notification packet 510 is a packet for notifying the dynamic addresses MA1 and MA2 for shortening a packet route from the host 11 to the mobile terminal 22.

Figure 7B:
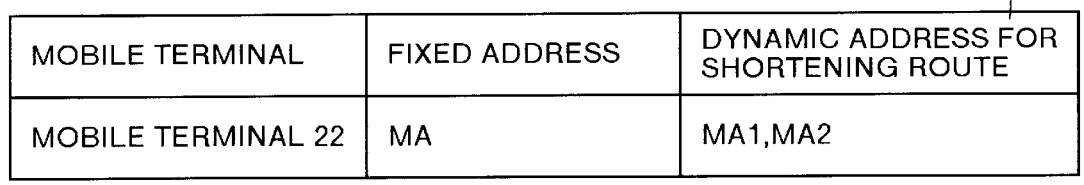

The shortened route dynamic address notification packet 510 is received by the host 11 by way of the fixed network 14, the main network 13 and the external network 12. The host 11 updates the "route shortening dynamic address" on the shortened route dynamic address table 600 shown in FIG. 7A to the dynamic addresses MA1 and MA2 based on the shortened route dynamic address notification packet 510. Thus, the shortened route dynamic address table 600 becomes the shortened route dynamic address table 610 shown in FIG. 7B.

The host 11 refers to the shortened route dynamic address table 610 and changes the current header of the packet addressed to the mobile terminal 22 from "dynamic address MA1" to "dynamic addresses MA1 and MA2". By doing so, the host 11 transmits a packet with the dynamic addresses MA1 and MA2 used as a header. This packet is directly received by the mobile terminal 22 within the areas $21_1$ and $21_2$ by way of the external network 12, the main network 13, the router 16, the mobile communication main network 17, the router $18_1$, the branch network $19_1$, the radio base stations $20_1$ and $20_2$ without going through the management server 15.

During this state, if the mobile terminal 22 goes out of the area $21_1$ and exists only in the area $21_2$, the allotment of the dynamic address MA1 to the mobile terminal 22 is released and the mobile terminal 22 is allotted only the dynamic address MA2. Thus, the mobile terminal 22 transmits the dynamic address deletion list packet 220 shown in FIG. 3C to the management server 15. As a result, the dynamic address deletion list packet 220 is received by the management server 15 by way of the radio base station $20_2$, the branch network $19_1$, the router $18_1$, the mobile communication main network 17, the router 16, the main network 13 and the fixed network 14.

The management server 15 deletes the dynamic address MA1 (see FIG. 3C) from the "dynamic address" field on the dynamic address management table 120 (see FIG. 2C)

which field corresponds to the mobile terminal 22 as shown in FIG. 2D. Thus, the dynamic address management table 120 becomes the dynamic address management table 130.

Figure 6C:
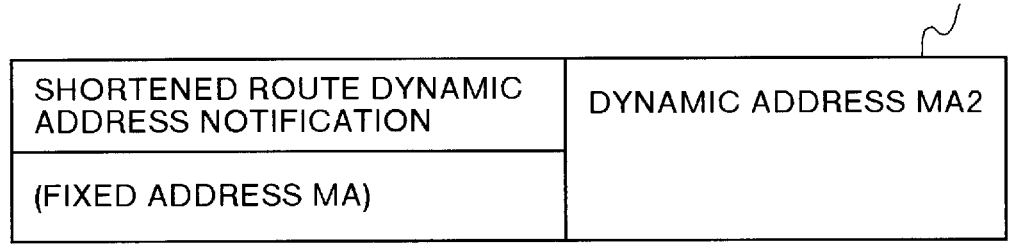

Further, the management server 15 outputs the shortened route dynamic address notification packet 520 shown in FIG. 6C to the host 11. This shortened route dynamic address notification packet 520 is a packet for notifying the dynamic address MA2 for shortening a packet route from the host 11 to the mobile terminal 22.

Figure 7C:

The shortened route dynamic address notification packet 520 is received by the host 11 by way of the fixed network 14, the main network 13 and the external network 12. The host 11 updates the "route shortening dynamic address" on the shortened route dynamic address table 610 shown in FIG. 7B to the dynamic address MA2 based on the shortened route dynamic address notification packet 520. Thus, the shortened route dynamic address table 610 becomes the shortened route dynamic address table 620 shown in FIG. 7C.

The host 11 refers to the shortened route dynamic address table 620 and changes the current header of the packet addressed to the mobile terminal 22 from "dynamic addresses MA1 and MA2" to "dynamic address MA2". By doing so, the host 11 transmits a packet with the dynamic address MA2 as a header. This packet is directly received by the mobile terminal 22 within the area $21_2$ by way of the external network 12, the main network 13, the router 16, the mobile communication main network 17, the router $18_1$, the branch network $19_1$ and the radio base station $20_2$ without going through the management server 15.

As stated so far, the dynamic address of the mobile terminal 22 is managed unitarily by the management server 15 in a real time manner. If a packet is transmitted from the host 11 and a dynamic address is allotted to the mobile terminal 22, the packet is transferred while the dynamic address allotted at this moment is used as a header. Therefore, compared with a conventional case, it is possible to reduce network control and management load relating to hand-over.

Furthermore, if the mobile terminal 22 stretches over two areas (e.g., areas $21_1$ and $21_2$), a packet is transferred while two dynamic addresses (e.g., dynamic addresses MA1 and MA2) corresponding to the respective areas is used as a header. Thus, it is possible to considerably decrease the probability of momentary disconnection during the hand-over.

Moreover, during hand-over, after packet transfer start is requested to the radio base station $20_2$ covering one area (e.g., area $21_2$), packet transfer stop is requested to the radio base station $20_1$ covering the other area (e.g., area $21_1$). It is, therefore, possible to reduce unnecessary traffic among radio lines.

In addition, the host 11 is notified of the dynamic address from the management server 15 in a real time manner and the host 11 directly transmits a packet with this dynamic address instead of the fixed address used as a header. It is, therefore, possible to shorten a packet transmission route.

One embodiment of the present invention has been described in detail with reference to the drawings. It is noted, however, that the concrete examples of the constitution of the invention should not be limited to this embodiment and that any changes in design or the like within the scope of the present invention are included in the present invention. For example, in the embodiment stated above, communication control may be conducted by recording a mobile communication control program for realizing the function of the management server 15 on a computer readable recording medium 900 shown in FIG. 8, allowing a computer shown in FIG. 8 to read and execute the mobile communication control program recorded on this recording medium 900.

Figure 8:
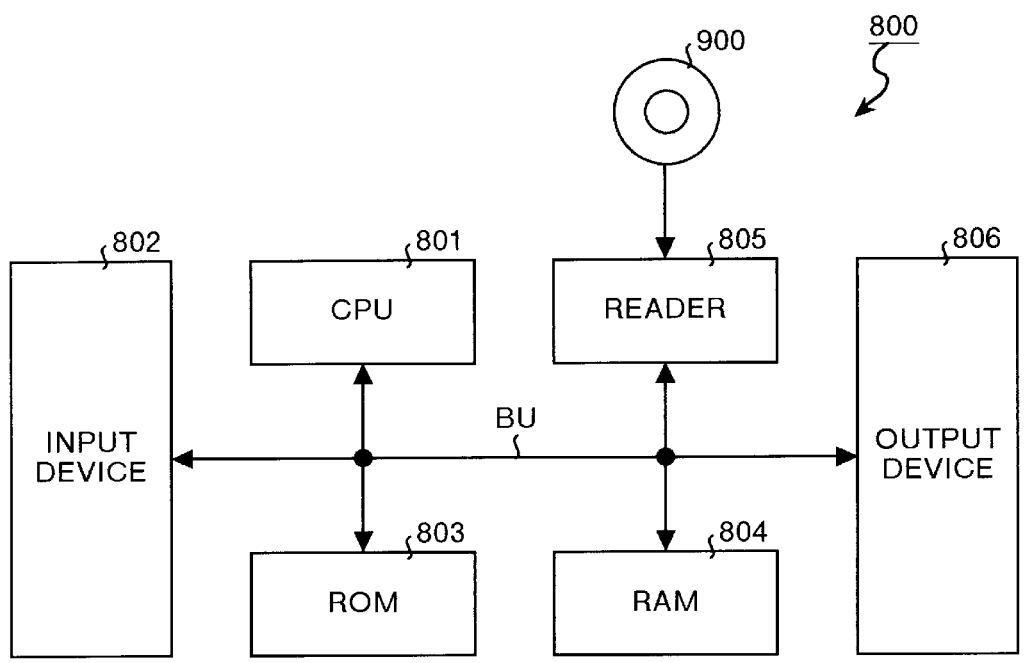
FIG. 8 is a block diagram showing a modification of the embodiment shown in FIG. 1.
Figure 9:
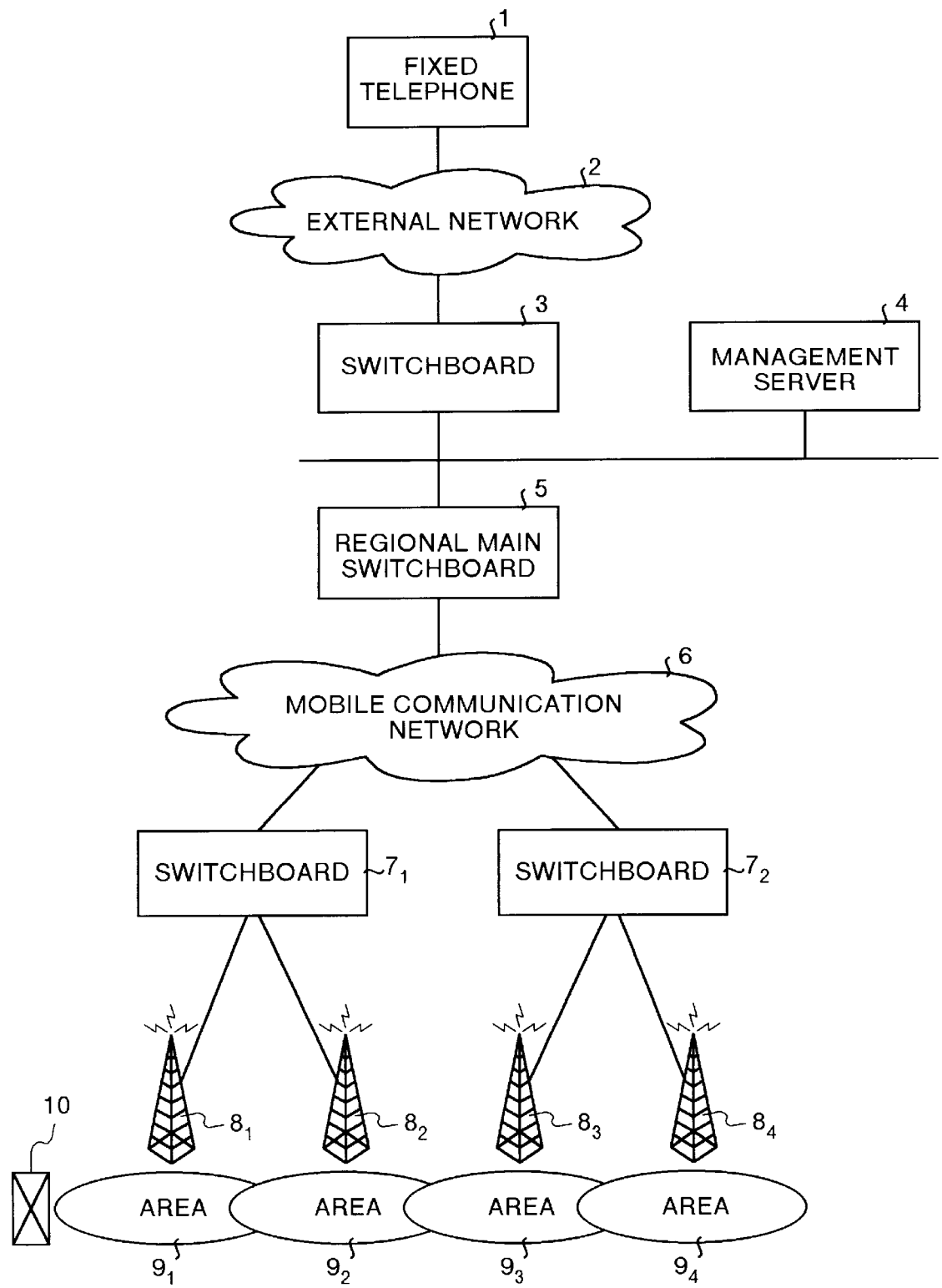
FIG. 9 is a block diagram showing the constitution of a conventional mobile communication system.

The computer 800 shown in FIG. 8 consists of a CPU 801 executing the mobile communication control program, an input device 802 including a keyboard, a mouse and the like, an ROM (Read OnlyMemory) 803 storing various data, an RAM (Random Access Memory) 804 storing operation parameters and the like, a reader 805 reading the mobile communication control program from the recording medium 900, an output device 806 including a display, a printer and the like, and a bus BU connecting the respective constituent elements.

The CPU 801 reads the mobile communication control program recorded on the recording medium 900 through the reader 805 and then executes the mobile communication control program, thereby conducting communication control as described above. The recording medium 900 includes not only portable recording mediums such as an optical disk, a floppy disk and a hard disk but also transmission mediums, such as a network, for temporarily recording and storing data.

The host 11 may be notified of the dynamic address from the mobile terminal 22 in a real time manner and the host 11 may transmit a packet with this dynamic address instead of the fixed address used as a header. If so, it is possible to further shorten a packet transmission route.

Further, according to one embodiment, description has been given to a case of realizing hand-over by transferring packets to the mobile terminal 22 from two radio base stations $20_1$ and $20_2$ if the mobile terminal 22 stretches over two areas $21_1$ and $21_2$. If the mobile terminal 22 stretches over three or more areas, it is possible to realize hand-over by transferring packets to the mobile terminal 22 from two ore more (or three or more) base stations.

Thus, according to the present invention, if one or more dynamic addresses of the mobile terminal are managed unitarily by the management server in a real time manner, information is transmitted from the host and one or more dynamic addresses are allotted to the mobile terminal, then information is transferred while using the one or more dynamic addresses allotted at this moment as a header. Therefore, compared with a conventional case, it is possible to advantageously reduce network control and management load relating to hand-over.

Furthermore, if the mobile terminal stretches over at least two service areas, information is transferred while using the first dynamic address and the second dynamic address corresponding to the respective service areas as a header. It is, therefore, possible to advantageously, considerably decrease the probability of momentary disconnection during hand-over.

Moreover, during the hand-over, after information transfer start is requested to a radio base station covering one area, information transfer stop is requested to a radio base station covering the other area. It is, therefore, possible to advantageously reduce unnecessary traffic among radio lines.

In addition, the host is notified of the dynamic address from the management server in a real time manner and the host directly transmits information with this dynamic address instead of the fixed address used as a header. It is, therefore, possible to advantageously shorten a packet transmission route.

Furthermore, the host is notified of the dynamic address from the mobile terminal in a real time manner and the host transmits information with this dynamic address instead of the fixed address used as a header. It is, therefore, possible to advantageously, further shorten the packet transmission route.

Furthermore, if a plurality of dynamic addresses of the mobile terminal are managed unitarily by the management server in a real time manner, information is transmitted from the host and a plurality of dynamic addresses are allotted to the mobile terminal, then information is transferred while using the plurality of dynamic addresses allotted at this moment as a header. Therefore, compared with a conventional case, it is possible to advantageously reduce network control and management load relating to hand-over.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mobile communication system comprising:
   a host;
   a plurality of radio base stations, each of said plurality of radio base stations covering a service area;
   at least one mobile terminal wherein said at least one mobile terminal and said host perform communication with each other through a base station out of said plurality of radio base stations in whose service area said at least one mobile terminal is present; and
   a management server which manages
      a) a fixed address of said at least one mobile terminal, and
      b) at least two dynamic addresses dynamically allotted to said at least one mobile terminal when the mobile terminal is present in at least two service areas at one time,
   wherein said host transmits information with the fixed address of said at least one mobile terminal as a header,
   said at least one mobile terminal notifies said management server of the dynamic address in a real time manner, and notifies, if present in at least two service areas, said management server of a first dynamic address and a second dynamic address corresponding to the at least two service areas, and
   said management server transfers the information with the first dynamic address and the second dynamic address used as a header if the information is transmitted from said host and the first dynamic address and the second dynamic address are allotted to said at least one mobile terminal.

2. The mobile communication system according to claim 1, wherein
   each of said plurality of radio base stations starts transferring information based on the dynamic address of said at least one mobile terminal when receiving an information transfer start request from said at least one mobile terminal, and stops transferring the information to said at least one mobile terminal when receiving an information transfer stop request from said at least one mobile terminal, and
   during hand-over, said at least one mobile terminal makes the information transfer start request to one of said radio base stations covering one of said service areas and thereafter makes the information transfer stop request to one of said radio base stations covering the other service area.

3. The mobile communication system according to claim 1, wherein
   said management server notifies said host of the dynamic address in a real time manner, and if the dynamic address is allotted to said at least one mobile terminal, said host transmits the information with the dynamic address allotted at this moment used as a header.

4. The mobile communication system according to claim 1, wherein
   said at least one mobile terminal notifies said host of the dynamic address in a real time manner, and if notified, said host transmits the information with the dynamic address, instead of the fixed address, used as a header.

5. A mobile communication system comprising:
   a host;
   a plurality of radio base stations, each of said plurality of radio base stations covering a service area;
   at least one mobile terminal, wherein said at least one mobile terminal and said host perform communication with each other through a base station out of said plurality of radio base stations in whose service area said at least one mobile terminal is present; and
   a management server which manages
      a) a fixed address of said at least one mobile terminal, and
      b) at least two dynamic addresses dynamically allotted to said at least one mobile terminal when in the mobile terminal is present in at least two service areas at one time,
   wherein said host transmits information with the fixed address of said at least one mobile terminal as a header,
   when said at least one mobile terminal is present in a plurality of service areas, the mobile terminal notifies said management server of a plurality of dynamic addresses corresponding to the plurality of service areas, and
   when such information is transmitted from said host and the plurality of dynamic addresses are allotted to said at least one mobile terminal, said management server transfers the information with the plurality of dynamic addresses used as a header.

6. A mobile communication control apparatus adapted to a mobile communication system, which mobile communication system comprising:
   a host;
   a plurality of radio base stations, each of said plurality of radio base stations covering a service area; and
   at least one mobile terminal, wherein said at least one mobile terminal and said host perform communication with each other through a base station out of said plurality of radio base stations in whose service area said at least one mobile terminal is present,
   said mobile communication control apparatus comprising:
      a management unit which manages
         a) a fixed address of said at least one mobile terminal, and,
         b) at least two dynamic addresses dynamically allotted to said at least one mobile terminal when the mobile terminal is preset in at least two service areas at one time and notified in a real time manner from said at least one mobile terminal; and
      a transfer unit which, if information is transmitted from said host with the fixed address used as a header said at least one mobile terminal present in at least two service areas and a first dynamic address and a second dynamic address corresponding to the respective service areas are allotted to said at least one mobile terminal, transfers the information with the first dynamic address and the second dynamic address used as a header.

7. A mobile communication control apparatus adapted to a mobile communication system, which mobile communication system comprises:

a host;

a plurality of radio base stations, each of said plurality of radio base stations covering a service area; and at least one mobile terminal, wherein said at least one mobile terminal and said host perform communication with each other through a base station out of said plurality of radio base stations in whose service area said at least one mobile terminal is present, said mobile communication control apparatus comprising:

a management unit which manages
a) a fixed address of said at least one mobile terminal, and,
b) at least two dynamic addresses dynamically allotted to said at least one mobile terminal when the mobile terminal is present in at least two service areas at one time and notified in a real time manner from said at least one mobile terminal; and a transfer unit which, if information is transmitted from said host with the fixed address used as a header said at least one mobile terminal is present in a plurality of service areas and a plurality of dynamic addresses corresponding to the respective service areas, transfers the information with the plurality of dynamic addresses used as a header.

8. A mobile communication control method adapted to a mobile communication system, which mobile communication system comprises:

a host;

a plurality of radio base stations, each of said plurality of radio base stations covering a service area; and at least one mobile terminal, wherein said at least one mobile terminal and said host perform communication with each other through a base station out of said plurality of radio base stations in whose service area said at least one mobile terminal is present, the mobile communication control method comprising:
a management step of managing
a) a fixed address of said at least one mobile terminal, and,
b) at least two dynamic addresses dynamically allotted to said at least one mobile terminal when the mobile terminal is present in at least two service areas at one time and notified in a real time manner from said at least one mobile terminal; and a transfer step of, if information is transmitted from said host with the fixed address used as a header said at least one mobile terminal is present in at least two service areas and a first dynamic address and a second dynamic address corresponding to the respective service areas are allotted to said at least one mobile terminal, transferring the information with the first dynamic address and the second dynamic address used as a header.

9. A mobile communication control method adapted to a mobile communication system, which mobile communication system comprises:

a host;

a plurality of radio base stations, each of said plurality of radio base stations covering a service area; and at least one mobile terminal, wherein said at least one mobile terminal and said host perform communication with each other through a base station out of said plurality of radio base stations in whose service area said at least one mobile terminal is present, the mobile communication control method comprising:
a management step of managing
a) a fixed address of said at least one mobile terminal, and,
b) at least two dynamic addresses dynamically allotted to said at least one mobile terminal when the mobile terminal is present in at least two service areas at one time and notified in a real time manner from said at least one mobile terminal; and a transfer step of, if information is transmitted from said host with the fixed address used as a header said at least one mobile terminal is present in a plurality of service areas and a plurality of dynamic addresses corresponding to the respective service areas, transferring the information with the plurality of dynamic addresses used as a header.

10. A computer readable medium for storing instructions, which when executed by a computer, causes the computer to realize a mobile communication control method adapted to a mobile communication system, which mobile communication system comprises:

a host;

a plurality of radio base stations, each of said plurality of radio base stations covering a service area; and at least one mobile terminal, wherein said at least one mobile terminal and said host perform communication with each other through a base station out of said plurality of radio base stations in whose service area said at least one mobile terminal is present, the mobile communication control method comprising:
a management step of managing
a) a fixed addresses of said at least one mobile terminal, and,
b) at least two dynamic address dynamically allotted to said at least one mobile terminal when the mobile terminal is present in at least two service areas at one time and notified in a real time manner from said at least one mobile terminal; and a transfer step of, if information is transmitted from said host with the fixed address used as a header said at least one mobile terminal is present in at least two service areas and a first dynamic address and a second dynamic address corresponding to the respective service areas are allotted to said at least one mobile terminal, transferring the information with the first dynamic address and the second dynamic address used as a header.

11. A computer readable medium for storing instructions, which when executed by a computer, causes the computer to realize a mobile communication control method adapted to a mobile communication system, which mobile communication system comprises:

a host;

a plurality of radio base stations, each of said plurality of radio base stations covering a service area; and at least one mobile terminal, wherein said at least one mobile terminal and said host perform communication with each other through a base station out of said plurality of radio base stations in whose service area said at least one mobile terminal is present, the mobile communication control method comprising:

a management step of managing
- a) a fixed addresses of said at least one mobile terminal, and,
- b) at least two dynamic address dynamically allotted to said at least one mobile terminal when the mobile terminal is present in at least two service areas at one time and notified in a real time manner from said at least one mobile terminal; and a transfer step of, if information is transmitted from said host with the fixed address used as a header said at least one mobile terminal is present in a plurality of service areas and a plurality of dynamic addresses corresponding to the respective service areas, transferring the information with the plurality of dynamic addresses used as a header.

12. A mobile communication system comprising:

a host;

a plurality of radio base stations, each of said plurality of radio base stations covering a service area;

a mobile terminal that communicates with the host through at least one of the base stations; and a management server which manages
- a) a fixed address of said mobile terminal, and
- b) at least two dynamic addresses dynamically allotted to said mobile terminal when the mobile terminal is present in at least two respective service areas at one time, wherein the mobile terminal notifies said management server of one dynamic address in a real time manner, and, if present in at least two service areas, notifies said management server of at least two dynamic addresses corresponding to the at least two service areas, said host transmits information with the fixed address of the mobile terminal as a header, and if the fixed address matches the mobile terminal and the mobile terminal is present in at least two service areas, the management server transfers the information from the host to the mobile terminal using the at least two dynamic addresses as a header.

* * * * *

UNITED STATES PATENT AND TRADEMARK OFFICE
CERTIFICATE OF CORRECTION

PATENT NO.   : 6,763,235 B2
DATED        : July 13, 2004
INVENTOR(S)  : Yuji Imai It is certified that error appears in the above-identified patent and that said Letters Patent is hereby corrected as shown below:

Column 14,
Line 44, change "comprising" to -- comprises --.
Line 60, after "is", change "preset" to -- present --.
Line 64, after "header", insert -- , --.
Line 65, after "terminal", insert -- is --.

Signed and Sealed this

Fifteenth Day of February, 2005

JON W. DUDAS
*Director of the United States Patent and Trademark Office*